US010008906B2

(12) United States Patent
Seibicke

(10) Patent No.: US 10,008,906 B2
(45) Date of Patent: Jun. 26, 2018

(54) ELECTRICAL ROTATING MACHINE WITH ONE-SIDED COOLING AND METHOD FOR ONE-SIDED COOLING

(71) Applicant: SIEMENS AKTIENGESELLSCHAFT, München (DE)

(72) Inventor: Frank Seibicke, Borkheide (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days. days.

(21) Appl. No.: 15/543,659

(22) PCT Filed: Dec. 2, 2015

(86) PCT No.: PCT/EP2015/078277
§ 371 (c)(1),
(2) Date: Jul. 14, 2017

(87) PCT Pub. No.: WO2016/113034
PCT Pub. Date: Jul. 21, 2016

(65) Prior Publication Data
US 2018/0006529 A1 Jan. 4, 2018

(30) Foreign Application Priority Data
Jan. 16, 2015 (EP) ..................... 15151477

(51) Int. Cl.
*H02K 9/00* (2006.01)
*H02K 9/04* (2006.01)
*H02K 1/20* (2006.01)
(52) U.S. Cl.
CPC ................ *H02K 9/04* (2013.01); *H02K 1/20* (2013.01); *H02K 2209/00* (2013.01)

(58) Field of Classification Search
CPC .. H02K 1/20; H02K 5/20; H02K 1/32; H02K 9/18; H02K 9/04; H02K 1/16
(Continued)

(56) References Cited

U.S. PATENT DOCUMENTS

| 3,819,965 A | * | 6/1974 | Schoendube | ......... H01F 27/085 |
| | | | | 310/58 |
| 6,262,501 B1 | * | 7/2001 | Semba | ..................... H02K 9/10 |
| | | | | 310/52 |

(Continued)

FOREIGN PATENT DOCUMENTS

| CN | 101227110 A | 7/2008 |
| CN | 101640450 A | 2/2010 |

(Continued)

*Primary Examiner* — Thanh Lam
(74) *Attorney, Agent, or Firm* — Henry M. Feiereisen LLC

(57) ABSTRACT

An electrical rotating machine includes a laminated stator core having a first axial duct to convey a cooling air stream generated by a turbomachine through the laminated stator core to a rear stator winding overhang, and a second axial duct to return the cooling air stream from the rear stator winding overhang back through the laminated stator core. An air guide is attached to the laminated stator core on a side of the rear stator winding overhang to redirect the cooling air stream via the rear stator winding overhang. Radial slots between the ducts and an air gap between the laminated stator core and a rotor are spaced from one another at an axial distance which decreases toward a turbomachine-distal side of the laminated stator core so as to compensate a temperature gradient caused by the one-sided cooling.

13 Claims, 5 Drawing Sheets

(58) Field of Classification Search
 USPC .................................................. 310/52–59
 See application file for complete search history.

(56) References Cited

U.S. PATENT DOCUMENTS

| | | | |
|---|---|---|---|
| 8,614,528 B2 * | 12/2013 | Eichinger | H02K 1/20 |
| | | | 310/56 |
| 9,106,109 B2 | 8/2015 | Seibicke et al. | |
| 9,233,373 B2 | 1/2016 | Kümmlee et al. | |
| 9,287,747 B2 | 3/2016 | Balzer et al. | |
| 2008/0169710 A1 | 7/2008 | Hattori et al. | |
| 2010/0026145 A1 | 2/2010 | Iwai et al. | |
| 2011/0140550 A1 * | 6/2011 | Brandl | H02K 5/20 |
| | | | 310/57 |
| 2011/0241350 A1 * | 10/2011 | Kori | H02K 1/20 |
| | | | 290/55 |
| 2011/0254392 A1 * | 10/2011 | Bradfield | H02K 1/20 |
| | | | 310/59 |
| 2014/0091653 A1 | 4/2014 | Saitou | |
| 2016/0087499 A1 | 3/2016 | Seibicke | |

FOREIGN PATENT DOCUMENTS

| | | |
|---|---|---|
| CN | 102005860 A | 4/2011 |
| DE | 102007021723 A1 | 11/2008 |
| DE | 102011053138 A1 | 2/2013 |
| DE | 102013203911 B3 | 8/2014 |
| EP | 2109207 A2 | 10/2009 |
| EP | 2518868 A1 | 10/2012 |
| GB | 431822 A | 7/1935 |
| JP | S60156241 A | 8/1985 |
| JP | 60151245 U1 | 10/1985 |
| SU | 1457070 A1 | 2/1989 |

* cited by examiner

ELECTRICAL ROTATING MACHINE WITH ONE-SIDED COOLING AND METHOD FOR ONE-SIDED COOLING

CROSS-REFERENCES TO RELATED APPLICATIONS

This application is the U.S. National Stage of International Application No. PCT/EP2015/078277, filed Dec. 2, 2015, which designated the United States and has been published as International Publication No. WO 2016/113034 which claims the priority of European Patent Application, Serial No. 15151477.5, filed Jan. 16, 2015, pursuant to 35 U.S.C. 119(a)-(d).

BACKGROUND OF THE INVENTION

The invention relates to a rotating electrical machine comprising a stator, a rotor and a turbomachine which is designed for one-sided cooling of the rotating electrical machine, wherein the stator has a laminated stator core, a front stator winding overhang and a rear stator winding overhang and wherein the rotor has a rear rotor winding overhang.

The field of the invention is that of large-scale electrical machines. Because of its slow motor speed, a large-scale machine of this kind, in particular a ring motor of the type used for gearless cement tube mills or also for tube mills for reducing copper ore, must be force-ventilated for cooling purposes. To this end, cooling air is either drawn in from the environment via filters or re-cooled in circulation via air-water coolers. The cooling air flow must be forced through different ducts of the motor using one or more fan-equipped turbomachines powered separately from the ring motor.

Electrical machines having one-sided ventilation, particularly large-scale machines with an output in excess of 10 megawatts and a diameter of more than 5 meters, such as ring motors, are mostly of comparatively simple construction in respect of the routing of airflow. However, because the air becomes heated over the axial length of the machine, the cooling effect diminishes with increasing axial length of the machine, which corresponds to a lengthening of the cooling path. These machines exhibit a temperature gradient which limits their use and can cause thermal stress.

The principle of one-sided ventilation of machines can only be used up to a limited overall length. After that, some other form of ventilation, e.g. two-sided ventilation, has to be used. This requires more overall length. Particularly in the case of machines with large diameters and large ventilation cross-sections, the cooling flow rate also has to be significantly increased in order to achieve approximately the same cooling conditions as with one-sided ventilation of the machine.

JP 60151245 U1 discloses a self-ventilated cooling system in which a fan draws the cooling air through the motor via ducts.

SUMMARY OF THE INVENTION

The object of the invention is to specify a rotating electrical machine of the type mentioned in the introduction in which cooling by one-sided ventilation is improved compared to the prior art, particularly in respect of an even temperature distribution.

This object is achieved according to the invention by a rotating electrical machine having a stator, a rotor, and a turbomachine which is designed for one-sided cooling of the rotating electrical machine, wherein the stator has a laminated stator core, a front stator winding overhang and a rear stator winding overhang, wherein the rotor has a rear rotor winding overhang, wherein the laminated stator core has ducts running in the axial direction which are designed to cool the rear stator winding overhang using a second cooling air stream generated by a turbomachine, in that at least one first duct is designed to convey a second cooling air stream generated by the turbomachine through the laminated stator core to the rear stator winding overhang, wherein an air guide which is attached to the laminated stator core on the side of the rear stator winding overhang is designed to redirect the second cooling air stream via the rear stator winding overhang, wherein at least one second duct is designed to convey the second cooling air stream from the rear stator winding overhang back through the laminated stator core, wherein at least two radial slots disposed in the axial direction which are disposed radially between the ducts running in the axial direction and an air gap between the laminated stator core and the rotor, and which interconnect the latter, are designed to cool the laminated stator core, in particular the stator windings, and/or the rear rotor winding overhang, wherein the axial distance between the radial slots decreases toward the side of the laminated stator core facing away from the turbomachine and is designed to compensate a temperature gradient caused by one-sided cooling.

The object is also inventively achieved by a method for one-sided cooling using at least one such rotating electrical machine.

The advantages of the implementation according to the invention, particularly for large-scale machines having an output in excess of 10 megawatts and a diameter of more than 5 meters, such as ring motors, for example, are in particular that, in spite of one-sided cooling, the rear winding overhangs are cooled virtually independently of the axial length of the laminated stator core by the axially running ducts for the cooling air stream and the selective redirection via the rear winding overhangs by the air guide. As the cooling air stream through the laminated stator core becomes heated toward the rear stator winding overhang, but the reverse cooling air stream away from the rear stator winding overhang is heated once more, the axial temperature gradient on the laminated stator core, in particular on the stator windings, caused by the one-sided cooling is at least partly compensated.

Radial slots are particularly advantageous, as they provide a means of at least partly compensating the axial temperature gradient on the laminated stator core, in particular on the stator windings, caused by the one-sided cooling. In addition, the rear rotor winding overhang is thus better cooled without additional fans, resulting in reduced complexity and lower costs.

Varying the distance between the radial slots provides an additional degree of freedom for compensating the temperature gradient caused by the one-sided cooling. Since, in the case of a long laminated stator core, the air becomes increasingly heated through the ducts running in the axial direction, for a constant cooling performance it is necessary to reduce the axial distances between the radial slots.

In another advantageous embodiment, the ducts running in the axial direction are disposed in the radial direction. This is particularly advantageous, as all the winding overhangs are thus uniformly cooled.

In a preferred embodiment, the rotating electrical machine has a rotor having a rear rotor winding overhang, wherein the turbomachine is designed to cool the rotor, the laminated stator core and/or the rear rotor winding overhang through an air gap between the laminated stator core and the rotor. One advantage of this embodiment is that, by means of this efficient use of the turbomachine, the constructional complexity in respect of the air guide is reduced, thereby achieving a good cost position.

In another preferred embodiment, the radial slots disposed in the axial direction are disposed in the rear third of the side of the laminated stator facing away from the turbomachine and are designed to compensate a temperature gradient caused by one-sided cooling. This is particularly advantageous, as it makes it possible to construct a rotating electrical machine with one-sided cooling comprising a stator having a greater axial length.

In another preferred embodiment, at least one auxiliary fan is disposed inside the air guide on the side of the rear stator winding overhang. The advantage of this is that the cooling efficiency is increased with minimal additional cost/complexity.

In an advantageous embodiment, the air guide has a least one nozzle for blowing out at least part of the second cooling air stream, wherein the part of the second cooling air stream blown out from the nozzle is designed to cool the rear rotor winding overhang. This is particularly advantageous, as the rear rotor winding overhang is additionally cooled by the at least one nozzle.

BRIEF DESCRIPTION OF THE DRAWINGS

The invention will now be described and explained in greater detail with reference to the exemplary embodiments illustrated in the drawings in which.

DETAILED DESCRIPTION OF THE EMBODIMENTS

Figure 1:
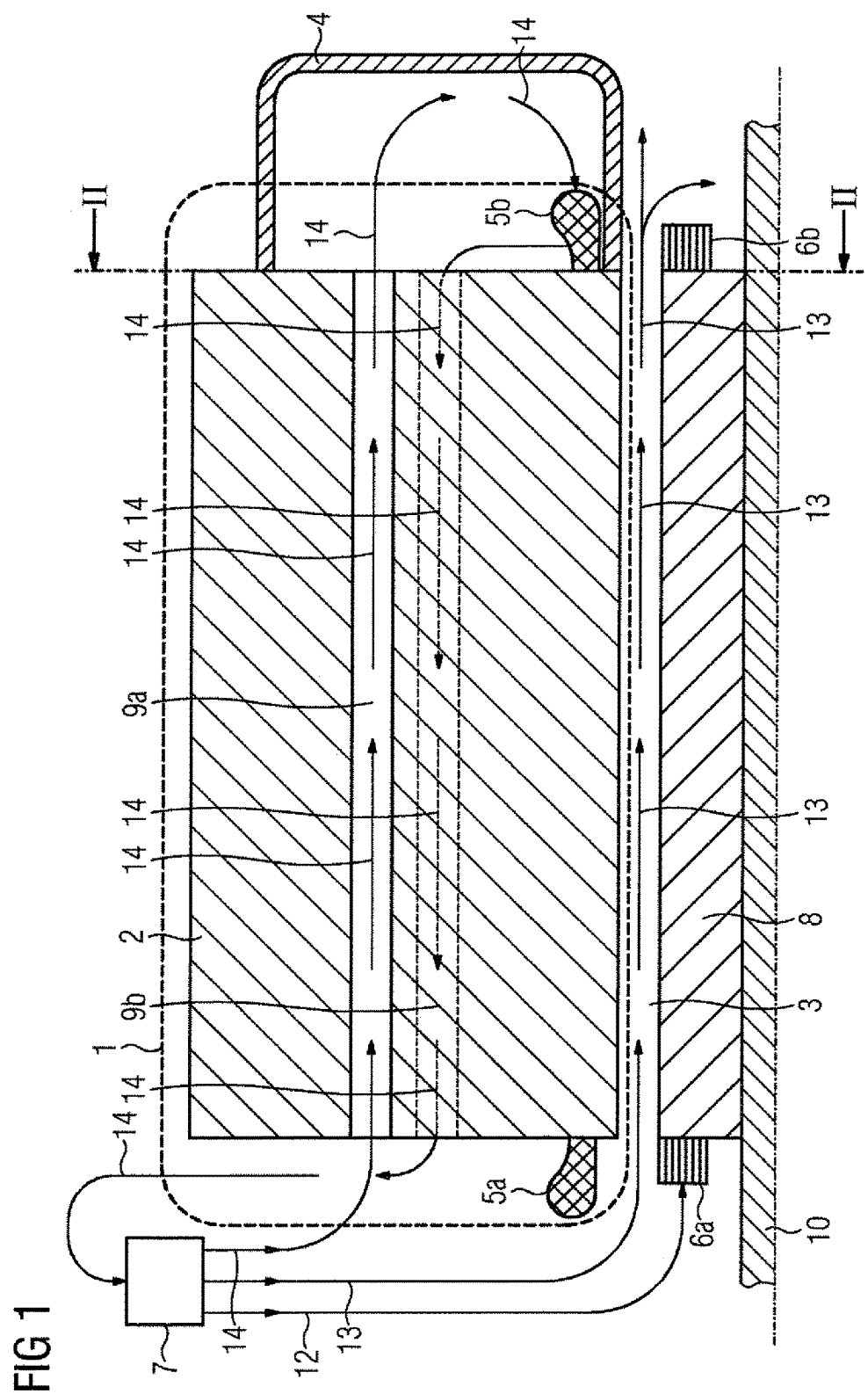
FIG. 1 shows a longitudinal section through a first exemplary embodiment of the rotating electrical machine.

FIG. 1 shows a longitudinal section through a first exemplary embodiment of the rotating electrical machine, said section being rotationally symmetrical in the axial direction, wherein only the upper part of the machine is shown. Such a machine, in particular a motor, has an output of more than 10 megawatts and a diameter of more than 5 meters. The rotating electrical machine comprises a stator 1 having a laminated stator core 2, a front stator winding overhang 5a and a rear stator winding overhang 5a. In addition, the rotating electrical machine has a rotor 8, comprising a front rotor winding overhang 6a and a rear rotor winding overhang 6b, and a shaft 10. A turbomachine 7 generates an in particular forced-draft cooling air flow 12, 13, 14 providing one-sided cooling of the machine. While the front rotor winding overhang 6a and the front stator winding overhang 5a are directly cooled by means of a third cooling air stream 12, a first cooling air stream 13 runs from the pressure side of the turbomachine 7 through an air gap 3 between the laminated stator core 2 and the rotor 8 in order to cool the rear rotor winding overhang 6b. In addition, the windings of the laminated stator core 2 and of the rotor 8 are cooled from one side by the first cooling air stream 13. A second cooling air stream 14 cools the laminated stator core 2 with the stator windings as well as the rear stator winding overhangs 5b through the axially running ventilation ducts 9a, 9b which are disposed radially in the laminated stator core about the axis of rotation, and an air redirecting guide 4 which is fastened to the laminated stator core 2 on the side of the rear stator winding overhang 5b and shuts off the area around the rear stator winding overhang 6b and the axially running ventilation ducts 9a, 9b. Here the second cooling air stream 14 flows in at least one first duct 9a through the laminated stator core 2 to the rear stator winding overhang 5b where the cooling air stream 14 is redirected by the air guide 4 via the rear stator winding overhang, and is then fed back by the air guide 4 in at least one second duct 9b from the rear stator winding overhang 5b through the laminated stator core 2 to the intake side of the turbomachine 7.

Figure 2:
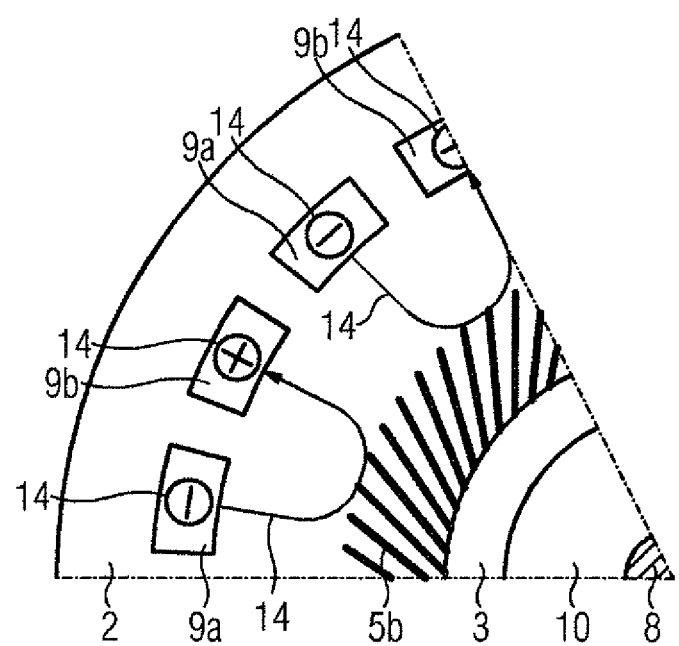
FIG. 2 shows a section along a line II-II in FIG. 1.

FIG. 2 shows a cross section through the rotating electrical machine along the line II-II in FIG. 1. Visible in addition to the schematically illustrated rotor 8 and shaft 10 are the air gap 3 between laminated stator core 2 and rotor 8, the rear stator winding overhangs 5b, and the ventilation ducts 9a, 9b. For reasons of clarity, the rear rotor winding overhangs 6b, the rotor windings and the stator windings are not shown here. The illustration shows that the ventilation ducts 9a, 9b are disposed radially about the axially running axis of rotation, wherein in this exemplary embodiment the cooling air stream 14 flows out of a first ventilation duct 9a and via the rear winding overhangs 5b, whereas it flows back via an adjacent second ventilation duct 9b.

Figure 3:
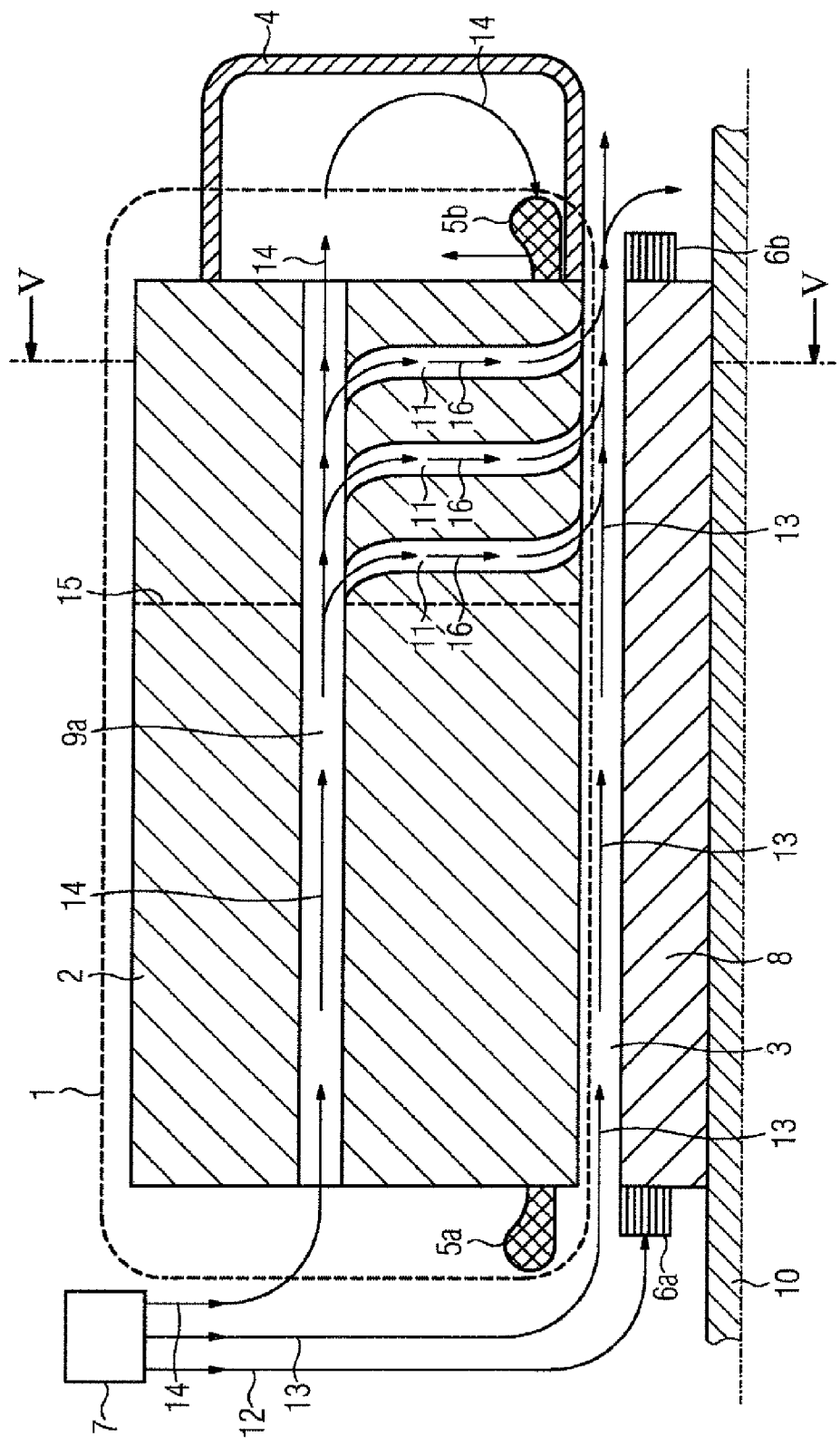
FIG. 3 shows a longitudinal section through a second exemplary embodiment of the rotating electrical machine.

FIG. 3 shows a longitudinal section through a second exemplary embodiment of the rotating electrical machine, wherein radial slots 11 additionally disposed in the axial direction redirect part of the second cooling air stream 14, which forms a cooling air stream 16 through the radial slots 11, from a first duct 9a through the laminated stator core 2 into the air gap 3. Thus the rear rotor winding overhangs 6b and the laminated stator core 2, in particular the rear section facing away from the turbomachine 7, e.g. the rear third 15 of the laminated stator core 2, are additionally cooled by the cooling air stream 16 of the radial slots 11.

Figure 4:
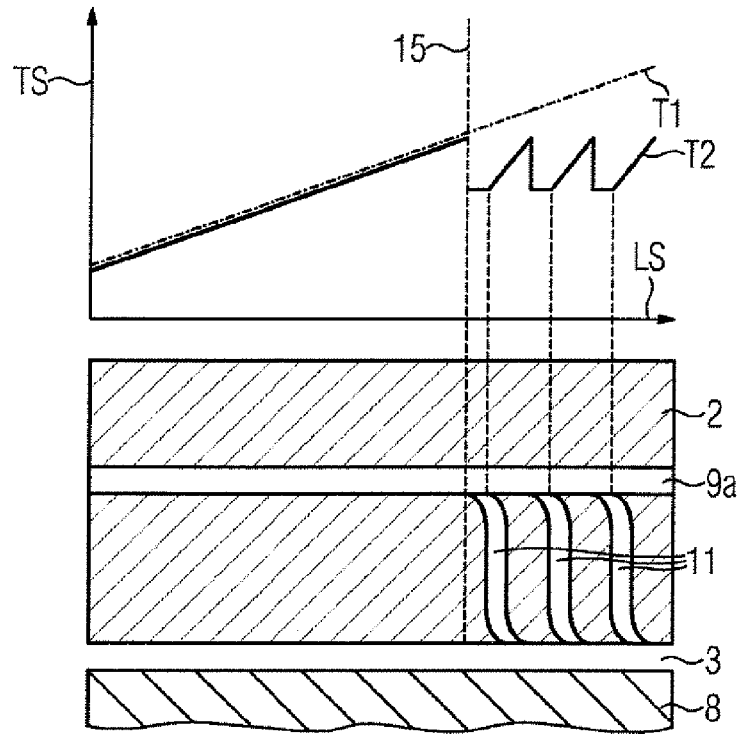
FIG. 4 shows a diagram of the temperature distribution over the axial length of the laminated stator core with and without the effect of the radial slots.

FIG. 4 shows a diagram of the temperature distribution TS over the axial length LS of the laminated stator core 2 with and without the effect of the cooling air stream 16 through the radial slots 11. As described above, the radial slots are disposed in the rear third 15 of the laminated stator core 2. Three radial slots 11 are shown by way of example. Without radial slots, the temperature T1 on the laminated stator core 2 rises continuously with increasing axial length LS of the laminated stator core 2. With radial slots, the temperature T2 on the laminated stator core 2 falls at the position of the radial slots 11 due to the cooling effect of the cooling air stream 16, so that the temperature T2 in the rear third 15 of the laminated stator core 2 is significantly below the temperature T1. In addition, the temperature T2 remains approximately constant in the rear third 15 of the laminated stator core 2, with certain fluctuations depending on the number of radial slots 11.

Figure 5:
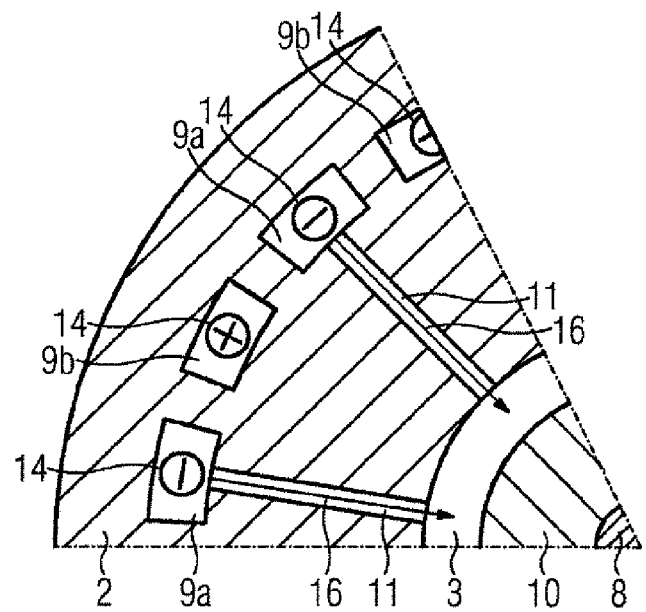
FIG. 5 shows a section along a line V-V in FIG. 3.

FIG. 5 shows a cross section through the rotating electrical machine along the line V-V in FIG. 3. In addition to the ventilation ducts 9a, 9b which are disposed radially about the axially running axis of rotation, the drawing shows the above described radial slots 11 which connect a first duct 9a to the air gap 3 between the laminated stator core 2 and the rotor 8. The stator windings and the rotor windings are not shown here for the sake of clarity.

Figure 6:
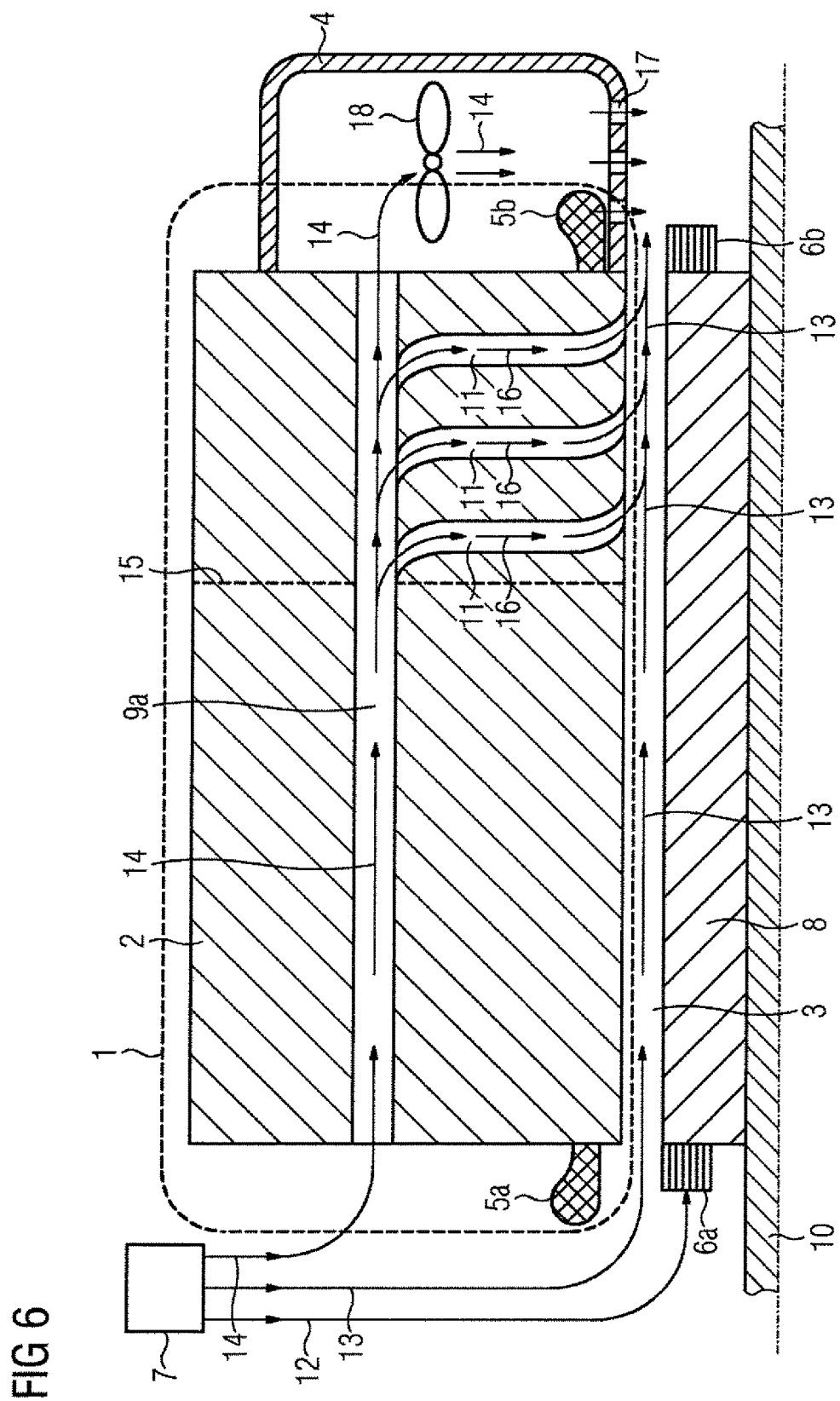
FIG. 6 shows a longitudinal section through a third exemplary embodiment of the rotating electrical machine.

FIG. 6 shows a longitudinal section through a third exemplary embodiment of the rotating electrical machine, wherein the air guide has nozzles 17 for blowing out at least part of the second cooling air stream 14 which is conveyed via the rear stator winding overhangs 5b. The part of the cooling air stream blown out from the nozzle 14 cools the rear rotor winding overhang 6b in addition to the first cooling air stream 13. An auxiliary fan 18 is disposed inside the air guide 4 and further improves the cooling by the second cooling air stream 14 on the side of the laminated stator core 2 facing away from the turbomachine 7.

To summarize, the invention relates to a rotating electrical machine having a stator 1, a rotor 8, and a turbomachine 7 which is designed for one-sided cooling of the rotating electrical machine, wherein the stator 1 has a laminated stator core 2, a front stator winding overhang 5a and a rear stator winding overhang 5b, wherein the rotor 8 has a rear rotor winding overhang 6b. In order to improve the cooling compared to the prior art in the case of one-sided ventilation, having regard in particular to an even temperature distribution, it is proposed that the laminated stator core 2 has ducts 9a, 9b running in the axial direction which are designed to cool the rear stator winding overhang 5b by means of a second air stream 14 generated by a turbomachine 7, wherein at least one first duct 9a is designed to convey a second cooling air stream 14 generated by the turbomachine 7 through the laminated stator core 2 to the rear stator winding overhang 5b, wherein an air guide 4 which is fastened to the laminated stator core 2 on the side of the rear stator winding overhang 5b is designed to redirect the second cooling air stream 14 via the rear stator winding overhang 5b, wherein at least one second duct 9b is designed to return the cooling air stream 14 from the rear stator winding overhang 5b back through the laminated stator core 2, wherein at least two radial slots 11 disposed in the axial direction which are disposed radially between the axially running ducts 9a, 9b and an air gap 3 between the laminated stator core 2 and the rotor 8 and which interconnect the latter are designed to cool the laminated stator core 2, in particular the stator windings, and/or the rear rotor winding overhang 6b, wherein the axial distance between the radial slots 11 decreases toward the side of the laminated stator core 2 facing away from the turbomachine 7 and is designed to compensate a temperature gradient caused by one-sided cooling.

What is claimed is:

1. An electrical rotating machine, comprising:
    a turbomachine configured for one-sided cooling of the rotating electrical machine;
    a stator including a front stator winding overhang, a rear stator winding overhang and a laminated stator core, said laminated stator core having first and second ducts running in an axial direction to cool the rear stator winding overhang via a cooling air stream generated by the turbomachine, with the first one of the ducts configured to convey the cooling air stream through the laminated stator core to the rear stator winding overhang, and the second one of the ducts being configured to return the cooling air stream from the rear stator winding overhang back through the laminated stator core;
    a rotor including a rear rotor winding overhang and separated from the laminated core by an air gap; and
    an air guide attached to the laminated stator core on a side of the rear stator winding overhang and configured to redirect the cooling air stream via the rear stator winding overhang,
    wherein at least two radial slots are disposed in the axial direction radially between the ducts and the air gap so as to interconnect the laminated stator core and the rotor and to enable the cooling air stream to cool at least one of the laminated stator core and the rear rotor winding overhang, said slots being spaced from one another at an axial distance which decreases toward a turbomachine-distal side of the laminated stator core so as to compensate a temperature gradient caused by the one-sided cooling.

2. The electrical rotating machine of claim 1, wherein the laminated stator core has stator windings which are cooled by the cooling air stream flowing in the radial slots.

3. The electrical rotating machine of claim 1, wherein the ducts are disposed in a radial direction.

4. The electrical rotating machine of claim 1, wherein the turbomachine is configured to cool at least one of the rotor, the laminated stator core, and the rear rotor winding overhang via the air gap.

5. The electrical rotating machine of claim 1, wherein the radial slots disposed in the axial direction are disposed in a rear third of the side of the laminated stator core.

6. The electrical rotating machine of claim 1, further comprising an auxiliary fan disposed inside the air guide on a side of the rear stator winding overhang.

7. The electrical rotating machine of claim 1, wherein the air guide has a nozzle for blowing out at least part of the cooling air stream to cool the rear rotor winding overhang.

8. A method for one-sided cooling of a rotating electrical machine, comprising:
    forming a first duct in an axial direction through a laminated stator core of a stator to convey a cooling air stream through the laminated stator core to a rear stator winding overhang of the stator;
    forming a second duct to return the cooling air stream from the rear stator winding overhang back through the laminated stator core;
    attaching an air guide to the laminated stator core on a side of the rear stator winding overhang for redirecting the cooling air stream via the rear stator winding overhang;
    interconnecting the laminated stator core and a rotor by at least two radial slots in the axial direction radially between the ducts and an air gap between the laminated stator core and the rotor so as to enable the cooling air stream to cool at least one of the laminated stator core and the rear rotor winding overhang; and
    spacing the slots from one another at an axial distance which decreases toward a turbomachine-distal side of the laminated stator core so as to compensate a temperature gradient caused by the one-sided cooling.

9. The method of claim 8, wherein the cooling air stream is generated by the turbomachine.

10. The method of claim 8, further comprising distancing the first and second ducts in a radial direction, and disposing the radial slots in a rear third of the turbomachine-distal side of the laminated stator core.

11. The method of claim 8, further comprising disposing an auxiliary fan inside the air guide on a side of the rear stator winding overhang.

12. The method of claim 8, further comprising blowing out at least part of the cooling air stream via a nozzle in the air guide for cooling the rear rotor winding overhang.

13. The method of claim 8, wherein the laminated stator core is uniformly cooled via the radial slots.

* * * * *